Nov. 14, 1950 K. M. SNIDER 2,529,821
HIGH-PRESSURE COUPLING
Filed May 9, 1947 2 Sheets-Sheet 2
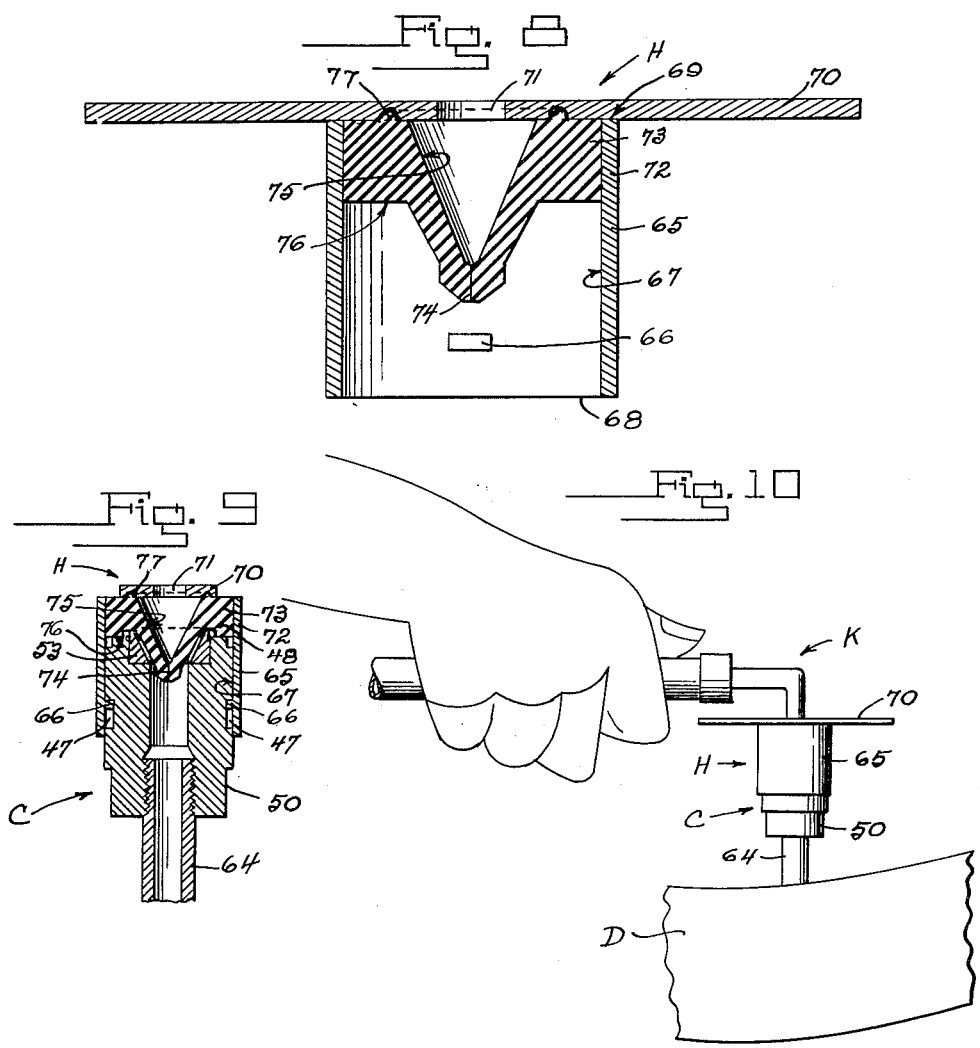
INVENTOR.
Kenneth M. Snider
BY Lancaster, Allwine and Rommel
ATTORNEYS.

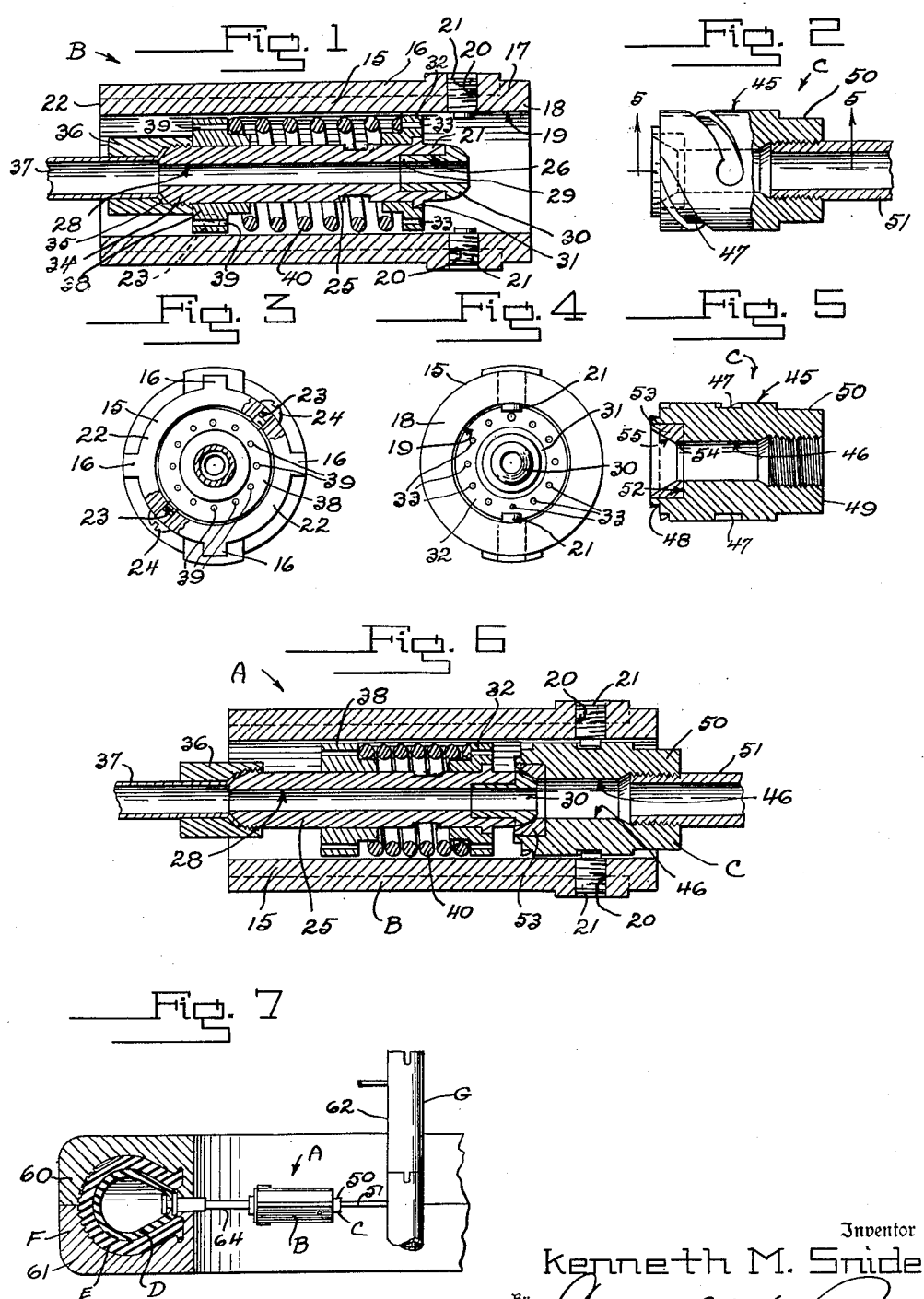

Patented Nov. 14, 1950

2,529,821

UNITED STATES PATENT OFFICE 2,529,821

HIGH-PRESSURE COUPLING

Kenneth M. Snider, Mansfield, Ohio, assignor of one-half to Marion A. Knapp, Mansfield, Ohio Application May 9, 1947, Serial No. 747,096

6 Claims. (Cl. 285—178)

This invention relates to quick coupling and uncoupling means for high pressure units. Such units may be employed, for example, in the manufacture of pneumatic tire casings.

An important object of the invention is to provide a quick-coupling and uncoupling means which is particularly adapted to prevent the escape of hot water, steam, hot air, air under pressure, and the like, from a valved container, during the time a conduit is being coupled to or uncoupled from the valve. This is especially important, for example, in some operations covering the use of expansible containers known generally as airbags and employed in the manufacture of tire casings. Such valved airbags, in collapsed condition and generally very hot, are inserted into partly finished tire casings, while the latter are in vacuum chambers, and the airbags expanded so as to retain the casings in proper shape. The operation of coupling the valves of the airbags to the air conduit sometimes results in the operator being injured, since hot water, hot air and/or steam, within the airbags, may be forced from the valves and over the operator's hands. Subsequently, the partly finished casings with the airbags therein, are inserted into sectional molds for shaping. In order that the mold section may meet, it is generally necessary to cause some of the air within the airbags to discharge. Here again, there is danger of injury, since the valves must be opened and closed by the removal and replacement of a valve cap. Next, the molds containing the casings and airbags, are stacked in a so-called pot heater. Each airbag must now be coupled with a source of air, steam or hot water which fluid flows through a manifold (known as a tree) extending upwardly from the axial center of the base of the pot heater and carrying a number of branch conduits with flexible connections to the airbag valves. Because of the confined space in which the operator's hands can work while making and uncoupling the connections between the flexible connections and valves, and the interference of the manifold and its branches, with the movements of the operator's hands, these members are sometimes scalded. Therefore, it is an important object of the invention to provide a quick means for coupling and uncoupling the valve members of the airbags and the conduits to which the heated fluid is conducted to the airbags. It should be noted that, while it is customary to take steps to drain hot condensate from the airbags after use and before they are reused, the drainage is often not thorough, hence sudden compression of the airbags, when the valve thereof is open, will cause the remaining hot (often scalding hot) water to squirt out. Not only is this novel coupling and uncoupling means quick acting but it is so constructed and arranged that the operator, in making the connection or uncoupling the parts has his hands in such positions that they are out of the way of discharging hot water, steam or hot air.

Another important object is to provide a quick coupling and uncoupling means which comprises few parts, is not apt to get out of order, break or become jammed, and may be manufactured at a relatively low cost.

Still another important object is to provide a novel valve structure for association with one of the parts of the novel coupling.

Other objects and advantages of the invention will be apparent during the following detailed description of the invention, taken in connection with the accompanying drawings, forming a part of this application, and in which drawings:

Figure 1 is a longitudinal section of one part of the novel coupling.

Figure 2 is a view partly in longitudinal section of the other part of the novel coupling.

Figure 3 is one end elevation of the coupling part of Figure 1.

Figure 4 is the other or right hand end elevation of the same coupling part.

Figure 5 is a section, substantially on the line 5—5 of Figure 2.

Figure 6 is a view, similar to Figure 1 and also showing the coupling part of Figure 2 in section with the two parts coupled.

Figure 7 is a view, on a reduced scale of an application of the novel coupling.

Figure 8 is a vertical section of a preferred valve structure employed with one of the novel coupling parts of Figure 2.

Figure 9 shows this valve (in section) connected to the coupling part of Figure 2, also in section.

Figure 10 illustrates application of a nozzle to the valve structure of Figures 8 and 9, mounted upon the coupling part of Figure 2.

In the drawings, wherein for the purpose of illustration is shown a preferred embodiment of the invention and wherein similar reference characters designate corresponding parts throughout the several views, the letter A designates the novel coupling comprising the parts B and C, while the letter D designates an airbag, insertable within a tire casing E which, in turn, is insertable in a mold F, and the latter, in its turn, is insertable in a so-called pot heater G.

The novel valve structure is designated at H and constructed and arranged for mounting upon a coupling part C. A nozzle cooperating therewith is designated as K.

The coupling part B, shown particularly in Figure 1, includes a preferably cylindrical shell or housing 15 having exterior, longitudinally extending ribs 16 joining an outwardly-extending flange 17 at the outer end 18 of the housing 15. These ribs provide for a good grip on the housing 15. Extending from the outer surface of the housing 15 adjacent the end 18, to its inner surface 19, which inner surface is smooth, is preferably two screw-threaded openings 20, each substantially 180° apart and each accommodating an exteriorly screw-threaded member 21, having a reduced inner end extending radially toward the axial center of the housing and inwardly of the plane of the surface 19, for cooperation with a pair of spiral grooves 47 in the part C, to be described.

In addition, the housing 15 is provided, at adjacent its inner end 22, with preferably two screw threaded openings 23 extending from the outer to the inner surfaces of the housing, accommodating screws 24 for securing a portion of the interior structure of the coupling part B to the housing, subsequently to be described.

Within the housing, adjacent its inner end is a tubular member 25, with the bore 26 at the forward end 27 of the member 25 increased in circumference over the circumference of the bore 28 which extends through the greater portion of the member 25. Because of this, a shoulder 29 is provided adjacent the end 27. The bore 26 accommodates the shank portion of a removable nipple 30 with the end of the shank portion abutting the shoulder 29 and the nipple portion extending outwardly of the end 27 of the member 25. The nipple shank portion is held in good frictional contact with the walls of the bore 26, but may be removed for renewal, change in size or the like.

Extending outwardly of the outer surface of the member 25 at adjacent the end 27 is a flange 31 forming a stop or abutment for a first ring-shaped portion 32, provided with a plurality of spaced apart openings 33 extending substantially parallel with the axis of the bore of the ring-shaped portion. The ring-shaped portion 32 is provided with a circular recess at its outer end, accommodating the flange 31. This portion 32 is disposed inwardly of the end 27 and spaced inwardly of the screw threaded members 21.

Between its ends 27 and 34, the member 25 may be provided with wrench holds or depressions in its outer surface and at its end 34 it may be bevelled, as at 35 and inwardly thereof, exteriorly screw threaded to receive the conventional interiorly screw threaded and bevelled coupling nut 36, so that a suitable tube 37 may be tightly coupled to the member 25 by flaring the free ends of the tube so this flaring end will fit over the bevelled surface 35 and be compressed thereagainst by the bevelled face of the coupling nut when the latter is screwed upon the member 25.

Slidable along the outer surface of the member 25 is a second ring-shaped portion 38, provided with a plurality of spaced-apart openings 39 extending in the same direction as the openings 33. This portion 38 is secured to the housing 15 by the ends of screws 24 bearing upon the portion 38. The portions 32 and 38 provide abutments for the ends of an expansion coil spring 40. Normally, when the coupling A is not in use, this spring 40 is not compressed. It will be noted in Figures 1 and 6 that the nipple 30 is at all times well inwardly of the end 18 of the housing 15.

In Figures 2 and 5 is shown the coupling part C. Preferably this is a two-piece member with a generally cylindrical outer surface 45 and a longitudinal bore 46, and the part C is provided with a pair of spiral grooves 47 (constructed and arranged to receive the free ends of the screw 21), each groove forming a helix, extending to the surface 45, from the forward end face 48 and falling short of the rearward end 49. The outer ends of the grooves are spaced 180° apart, and each groove extends about substantially 180° of the part C. Between the inner end of the grooves 47 and the rearward end 49 of the part C, the part C is provided with a wrench grip 50. From the end 49 inwardly, the bore 46 is screw threaded for coupling thereto a suitable tube or conduit 51. The bore 46 is enlarged at the forward end 48 so that a shoulder 52 is provided and the enlarged bore and shoulder snugly accommodate an insert 53 having a bore 54 bevelled as at 55 at its mouth. This bevelled surface is constructed and arranged to receive the nipple 30 in a slidable fit, but snug enough to prevent escape of fluid when the nipple 30 is within the bevelled portion of the part C, as shown in Figure 6.

Since the second ring-shaped portion 38 is secured to the housing 15, it will move therewith, sliding along the surface of the member 25. Movement of the first ring-shaped portion 32 to the left, as in Figure 6, will compress the spring 40 and such compression is effected when the two parts B and C are coupled together as in Figure 6. This is accomplished by manipulating the parts so that the free ends of the screws 21 will enter the grooves 47 whereupon quick rotation of one or the other of the parts B or C will cause the free ends to follow the grooves and the coupling to be effected, as in Figure 6, with the spring 40 under compression. The free ends of the screws will follow the grooves quickly and without pressure or pulling on the part of the operator, either to couple or uncouple the coupling parts B and C because the grooves are true helixes. When coupled the two parts B and C provide a coupling only very slightly longer than the overall length of the coupling A. It is now clear that the openings 33 and 39 in the ring-shaped portions 32 and 38 are to prevent a vacuum within the space between these two members as they move away from each other and to prevent air compression when they move toward each other.

In Figure 7 is shown an airbag D within a casing E, inserted in a mold F comprising two parts 60 and 61. A number of molds F are usually disposed within a so-called pot heater G, one above another, with a manifold structure 62 extending upwardly from the axial center of the pot heater and provided with branches which may comprise a number of the tubes 51. Each branch 51 carries, at its free end, one of the coupling parts C. The tube attached to the coupling part B may extend to the airbag or it may be provided with the gooseneck nozzle K of Figure 9 for a detachable connection with the port of the airbag.

In connection with the intake port of the airbag there is shown the valve structure H of Figures 8, 9 and 10. This valve structure comprises a cylindrical housing 65 provided with a pair of lugs 66 extending from the inner surface 67 of the housing 65, radially toward the axial center of the housing, being preferably disposed adjacent its lower end 68. Secured upon the upper end edge 69 of the housing 65 is an elongated plate or member 70 of metal or the like having a circular aperture or perforation 71 with its axis aligned with the longitudinal axis of the housing. Within the upper portion 72 of the housing is a valve member 73 preferably of rubber having a normally closed valve opening 74 at its lower end portion, said valve opening being a slit. The valve member 73 is provided with a conical seat 75 adapted to receive the free open end of the gooseneck nozzle K with the apex of the core pointing toward the intersection of the axis of the lugs 66 and the longitudinal axis of the housing 65. The valve member 73 may be held frictionally within the housing 65 and is prevented from blowing upwardly and outwardly from the housing 65 as by air pressure below the member 73, by the overhanging portions of the plate 70 as is apparent in Figure 8. Movement of the valve member in the other direction, as by air pressure issuing from the nozzle K, is prevented, as is apparent in Figure 9 due to the forward end face 48 of the coupling part C since the valve structure H is adapted to be mounted upon the coupling part C, by causing the lugs 66 to ride along the two spiral grooves 47 of the coupling part C whereupon the substantially flat lower face 76 of the valve member 73 will come to rest upon the forward end face 48 of this coupling part.

Extending upwardly from the upper end of the valve member 73 is a bead 77 extending into a circular groove in the plate 70 in order to insure a good connection and fluid-tight seal.

From the foregoing it is now obvious that the specific valve structure H is particularly adapted for association with the coupling part C and that the coupling part B is also particularly adapted for association with this coupling part C.

The coupling part C may be mounted upon the exteriorly screw threaded end of the conduit 64 extending from exteriorly of the airbag D to the interior thereof.

This novel valve structure H prevents, as is obvious, the escape of fluid from the airbag when it is detachably mounted, as described, upon a coupling part C yet fluid may be permitted to be discharged from the airbag simply by rotating the valve structure H and removing it. It is as readily mounted upon the coupling part C.

When the gooseneck nozzle K is inserted as in Figure 10, the fluid pressure will cause the slit 74 to open and fluid to flow readily into the conduit 64. After the curing process the airbag is removed from the aired tire, or casing, the housing 65 and its associated structure are then placed on adapter as shown in Figures 9 and 10, the bag then goes through the dip tank with a small inserted volume of air so as to check the bag for leaks and clear the air bag. The bag then goes to the bagging process to be placed in a green tire. To do this, the bagger removes the housing 65 and lays it aside, while bag is placed in a green casing or tire whereupon the air housing is replaced on adapter as shown in Figure 10 and air forced into the bag. There are times when the air operation is overlooked and, as the bag cools, a vacuum is created in the bag and it would collapse, but the slit in valve 74 relieves the vacuum and prevents the bag and casing from becoming distorted.

In addition to preventing a vacuum or air compression, as stated, the openings 33 and 39 allow the pressure from the bag, when uncoupled from the coupling to exit through the end 22 of the coupling part B and thus prevent the pressure fluid to blow or spray upon the operator's hands or body. These openings also provide exits for any material which would otherwise accumulate within the coupling part B and about the spring 40.

It is important that the insert 53 be of suitable metal or alloys thereof in order to prevent corrosion.

Various changes in the shape, size and arrangement of parts may be made to the form of invention herein shown and described without departing from the spirit of the invention or the scope of the following claims.

What is claimed is:

1. In couplings, a first coupling part including a cylindrical portion provided with a projection extending into the passageway therein, a second coupling part having an outer end, an inner end, an outer face and a groove in said outer face, provided with a mouth opening into said outer end and falling short of said inner end, said groove being a true helix from its mouth to substantially its inner end, and being constructed and arranged to receive said projection, and means carried by said first coupling part tending to force said second coupling part outwardly of said first coupling part when said projection is at the inner end of said groove.

2. In couplings, a first coupling part including a cylindrical portion provided with a projection extending into the passageway therein, a second coupling part having an outer end, an inner end, an outer face and a groove in said outer face, provided with a mouth opening into said outer end and falling short of said inner end, said groove being a true helix from its mouth to substantially its inner end, and being constructed and arranged to receive said projection, and means carried by said first coupling part tending to force said second coupling part outwardly of said first coupling part when said projection is at the inner end of said groove, including a ring-shaped member carried by and wholly within said cylindrical portion, a tubular member within said cylindrical portion and extending through said ring-shaped member and with said ring-shaped member fixedly secured thereto, a second ring-shaped member slidable within the cylindrical portion and carried by said tubular member, at least one of said ring-shaped members being provided with a perforation spaced from the axial center thereof, and an expansion coil spring within said cylindrical portion extending about said tubular member and bearing against said ring-shaped members.

3. In couplings, a first coupling part including a cylindrical portion provided with a projection extending into the passageway therein, a second coupling part having an outer end, an inner end, an outer face and a groove in said outer face, provided with a mouth opening into said outer end and falling short of said inner end, said groove being a true helix from its mouth to substantially its inner end, and being constructed and arranged to receive said projection, and means carried by said first coupling part tending to force said second coupling part outwardly of said first coupling part when said projection is at the inner end of said groove, including a fixed ring-shaped member carried by and wholly within said cylindrical portion, a tubular member within said cylindrical portion and extending through and fixed to said first ring-shaped member, a second ring-shaped member slidable within the cylindrical portion and carried by said tubular member, at least one of said ring-shaped members being provided with a perforation spaced from the axial center thereof, and an expansion coil spring within said cylindrical portion extending about said tubular member and bearing against said ring-shaped members, said tubular member being provided with means to secure a conduit thereto at the end thereof adjacent said second ring-shaped member.

4. In couplings, a first coupling part including a cylindrical portion provided with a projection extending into the passageway therein, a second coupling part having an outer end, an inner end, an outer face and a groove in said outer face, provided with a mouth opening into said outer end and falling short of said inner end, said groove being a true helix from its mouth to substantially its inner end, and being constructed and arranged to receive said projection, and means carried by said first coupling part tending to force said second coupling part outwardly of said first coupling part when said projection is at the inner end of said groove, including a fixed ring-shaped member carried by and wholly within said cylindrical portion, a tubular member within said cylindrical portion and extending through said ring-shaped member and with said ring-shaped member fixed to said tubular member, a second ring-shaped member slidable within the cylindrical portion and carried by said tubular member, and an expansion coil spring within said cylindrical portion extending about said tubular member and bearing against said ring-shaped members; and means for detachably coupling a conduit to said tubular member outwardly of said fixed ring-shaped member, including a nut carried by said tubular member and having an end face providing an abutment for said second ring-shaped member when said first and second coupling parts are uncoupled.

5. In couplings, a first coupling part including a cylindrical portion provided with a projection extending into the passageway therein, a second coupling part having an outer end, an inner end, an outer face and a groove in said outer face, provided with a mouth opening into said outer end and falling short of said inner end and said groove being a true helix from its mouth to substantially its inner end, and being constructed and arranged to receive said projection, and means carried by said first coupling part tending to force said second coupling part outwardly of said first coupling part when said projection is at the inner end of said groove, including a fixed ring-shaped member carried by and wholly within said cylindrical portion, a tubular member within said cylindrical portion and extending through said ring-shaped member and with said ring-shaped member fixed to said tubular member, a second ring-shaped member slidable within the cylindrical portion and carried by said tubular member, and an expansion coil spring within said cylindrical portion extending about said tubular member and bearing against said ring-shaped members; and means for detachably coupling a conduit to said tubular member outwardly of said fixed ring-shaped member, including a nut carried by said tubular member and having a side face spaced from the inner face of said cylindrical portion and an end face providing an abutment for said second ring-shaped member when said first and second coupling parts are uncoupled.

6. In couplings, a first coupling part including a cylindrical portion open at both ends, a second coupling part having an inner end face, means carried by said coupling parts for detachably coupling them together adjacent one of said open ends, including a projection carried by one of said coupling parts and the walls of a projection-receiving groove closed at its inner end, said walls carried by the other coupling part and said groove adapted to slidably receive said projection, means carried by said first coupling part tending to force said second coupling part outwardly of said first coupling part when said projection is at the inner end of said groove, including a fixed ring-shaped member carried by and wholly within said cylindrical portion, a tubular member within said cylindrical portion and extending through said ring-shaped member and with said ring-shaped member fixed to said tubular member, a second ring-shaped member slidable within the cylindrical portion and carried by said tubular member, and an expansion coil spring within said cylindrical portion extending about said tubular member and bearing against said ring-shaped member; and means for detachably coupling a conduit to said tubular member outwardly of said fixed ring-shaped member, including a nut carried by said tubular member and having an end face providing an abutment for said second ring-shaped member when said first and second coupling parts are uncoupled.

KENNETH M. SNIDER.

REFERENCES CITED

The following references are of record in the file of this patent:

UNITED STATES PATENTS

| Number | Name | Date |
| --- | --- | --- |
| 1,487,696 | Smith | Mar. 19, 1924 |
| 1,921,533 | Maynard | Aug. 8, 1933 |
| 2,155,640 | Bruce | Apr. 25, 1939 |
| 2,240,979 | Byers | Mar. 6, 1941 |
| 2,305,809 | Maisch | Dec. 22, 1942 |
| 2,417,968 | Browne | Mar. 25, 1947 |